(Model.) 3 Sheets—Sheet 1.
A. G. PATTON.
WAFFLE IRON.
No. 246,194. Patented Aug. 23, 1881.
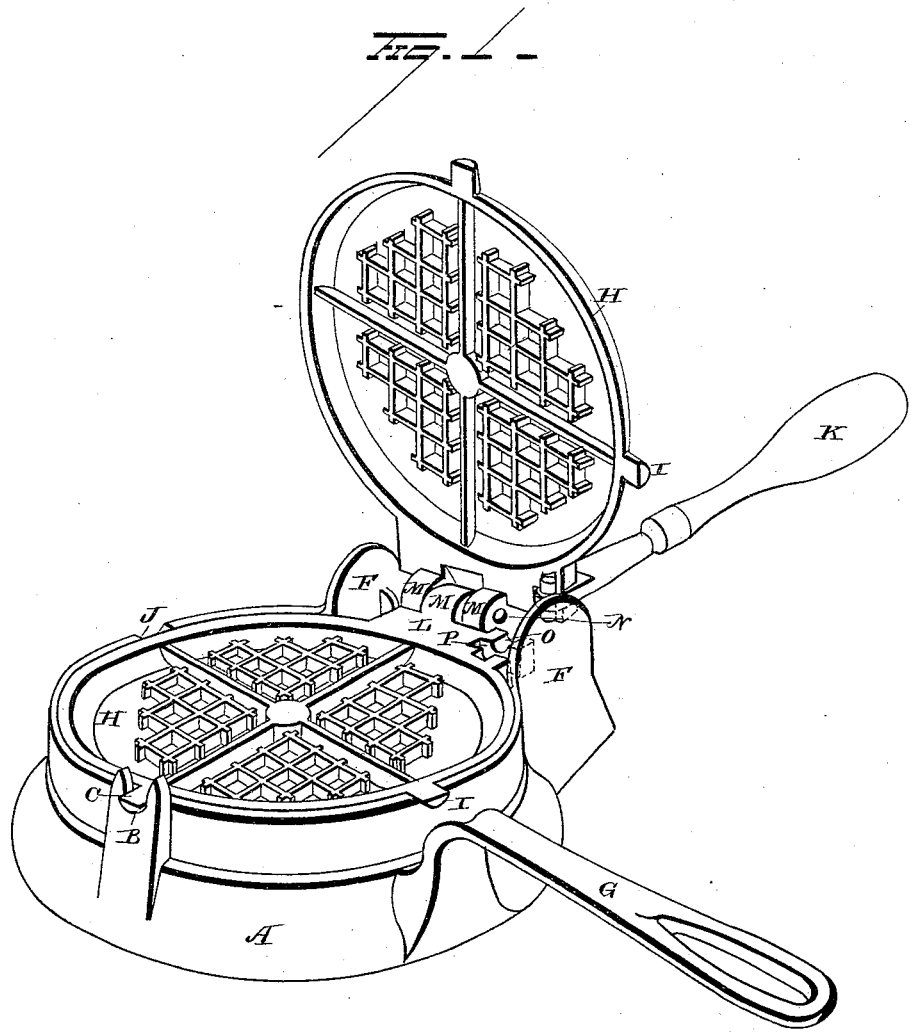

(Model.) 3 Sheets—Sheet 2.
A. G. PATTON.
WAFFLE IRON.
No. 246,194. Patented Aug. 23, 1881.
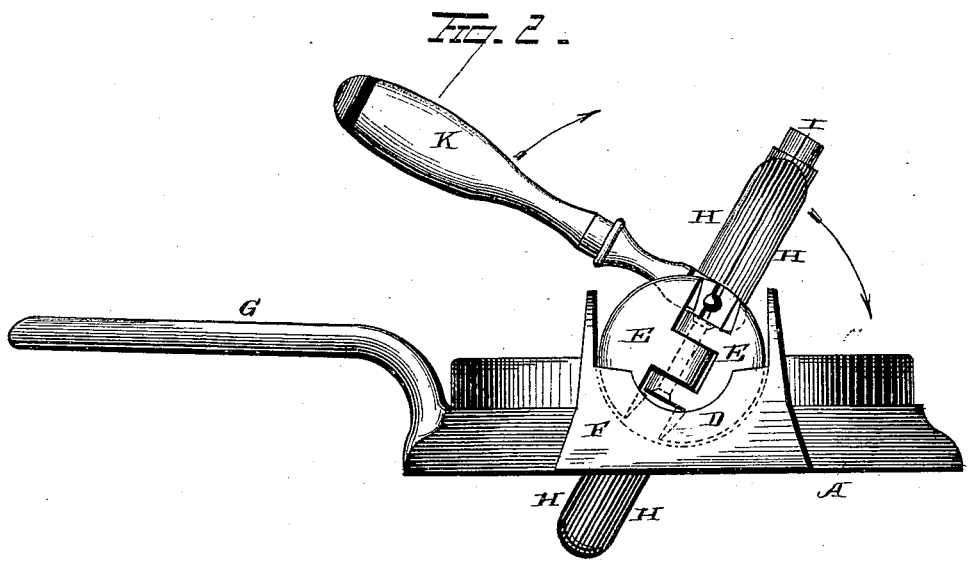
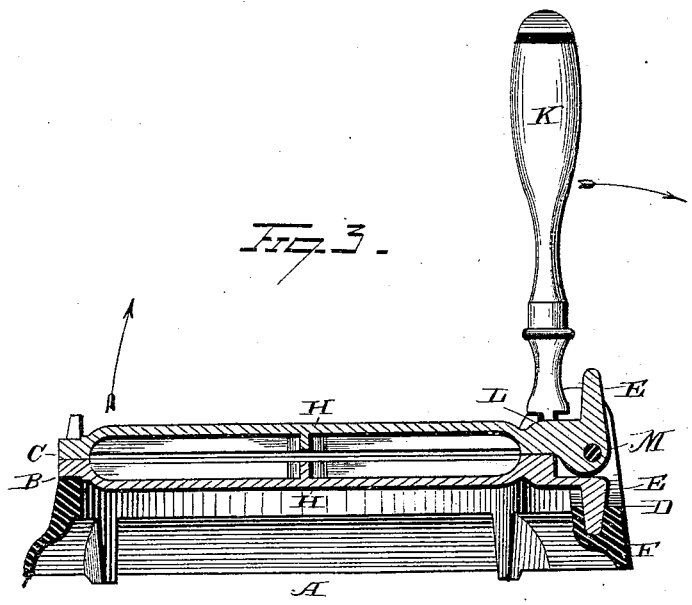
WITNESSES
E. J. Nottingham
Herman Moran
INVENTOR
Alexander G. Patton,
By H. A. Seymour,
ATTORNEY

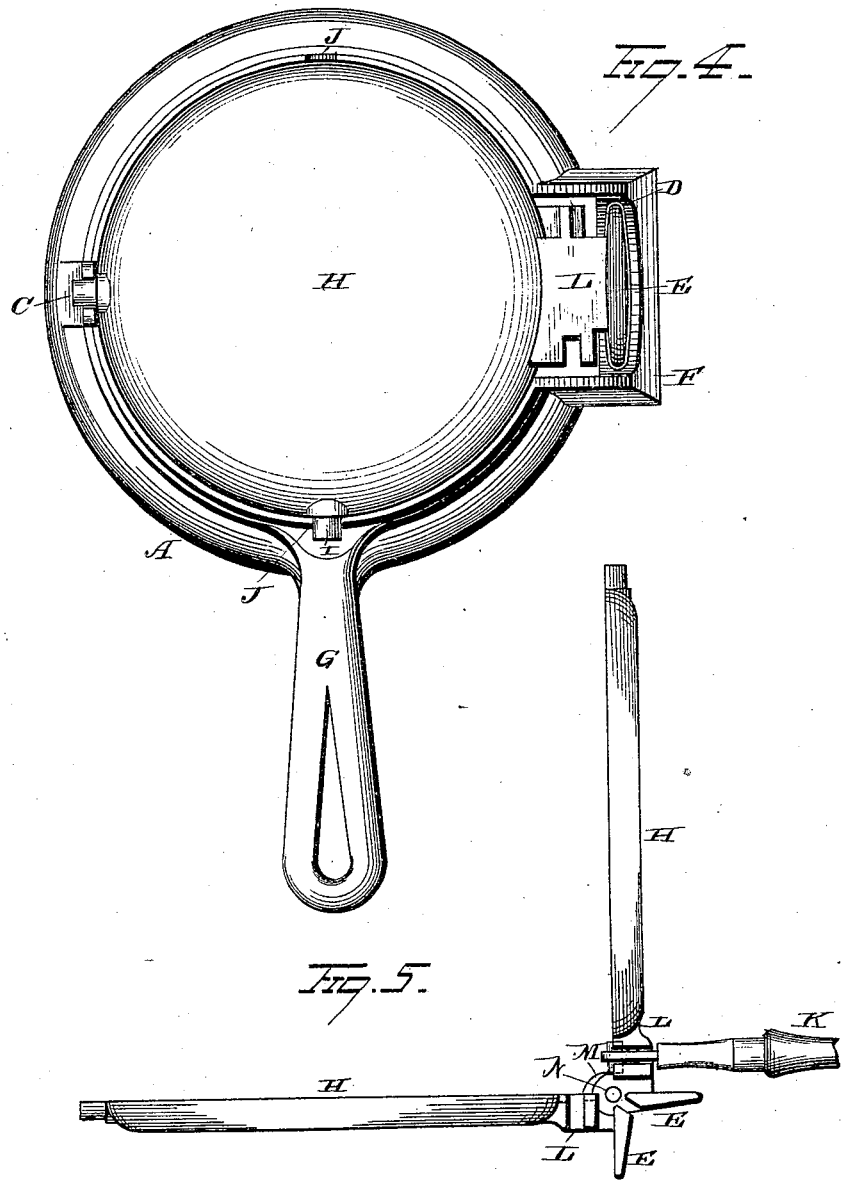

United States Patent Office.

ALEXANDER G. PATTON, OF COLUMBUS, OHIO.

WAFFLE-IRON.

SPECIFICATION forming part of Letters Patent No. 246,194, dated August 23, 1881.

Application filed April 11, 1881. (Model.)

*To all whom it may concern:*

Be it known that I, ALEXANDER G. PATTON, a resident of the city of Columbus, county of Franklin, and State of Ohio, and a citizen of the United States, have invented a new and useful Improvement in Waffle-Irons, of which the following is a full and correct specification, reference being had to the drawings making a part hereof.

My invention relates to an improvement in waffle-irons.

Heretofore waffle-irons have been constructed with their handles made integral with the pan, or immovably secured thereto, and located on the side of the pan opposite its hinge, or else on the opposite side from one journal. In a waffle-iron having its handle located on the side opposite its hinge the latter has had a journal pivoted or hinged thereto, whereby the pan is capable of being rotated by the handle.

The object of my invention is to provide a waffle-iron with a handle adapted to be pivotally connected with the hinge of the pan-sections, whereby the pan may be readily opened and closed.

A further object of my invention is to provide the pan with a journal formed integral with its hinge, thereby simplifying the construction of parts and enhancing the strength and durability of the device.

A further object of my invention is to provide the combined hinge and journal of the pan with a handle, which shall be connected therewith in such a manner that the pan may be opened and rotated by the handle.

With these objects in view my invention consists in certain features of construction and combinations of parts, as will hereinafter be described, and pointed out in the claims.

In the accompanying drawings, Figure 1 is a perspective view of a waffle-iron constructed in accordance with my invention, showing the waffle-pan in open adjustment. Fig. 2 is a view in side elevation, showing the position of the pan and handle after partial rotation. Fig. 3 is a view in vertical section through the combined journal and hinge of the pan. Fig. 4 is a plan view of the waffle-iron with the handle detached, and Fig. 5 is a view in side elevation of the waffle-pan in open adjustment.

A represents the frame in which the waffle-pan is mounted and in which it rotates. It is provided with a bearing, B, for the simple journal C of the waffle-pan, and with a grooved semicircular bearing, D, to receive the hinge-journal E thereof. The said bearing D is formed in a projection, F, of the frame A, and is itself cut away to give ample room for the rotation of the hinge-journal E aforesaid. A handle, G, rigidly secured to or cast integral with frame A, enables it to be readily handled in placing it on or removing it from the stove. The waffle-pan is of ordinary construction, in so far as it is formed in two half-sections, H, and provided with the usual fanciful interior configurations. Each of the sections H is formed with semicircular projections, which, when in conjunction, form the journal C, adapted to be received in the journal-bearing B and the stop I, respectively, the latter being received, according to the adjustment of the pan, in either one of the depressions J, formed in opposite edges of the frame A.

One of the distinguishing features of my invention consists in the hinge-journal E, which fulfills a threefold function, in being one of the two journals by means of which the waffle-pan is mounted and revolved in the frame A, in embodying the hinge connecting the two sections of the pan, and in providing attachment for the handle K, which in itself performs the twofold duty of opening the pan and of revolving it. Each section of the pan is provided with a shank, L, at the end of and at right angles to which is formed a semicircular flange. The flat faces of the said flanges of the two pan-sections are furnished with knuckles M, which fit within each other and are connected by a pin, N. The two semicircular flanges, joined as described, together constitute the hinge-journal E, substantially circular in shape, and adapted to be received in the grooved bearing D formed in the frame A. It is also obvious that when the pan is in a horizontal position, be either of its sections uppermost, it may be opened on the hinge formed by joining the flanges of the two pan-sections without disturbing its adjustment in the grooved bearing E.

The pan is both rotated in its bearings and opened by means of a handle, K, the flattened inner end of which is made of metal, and provided with a T-arm adapted to be received in semicircular grooves O, formed near the edges of the inner faces of the shanks L of the two pan-sections and on opposite sides of vertical slots P, formed also in the said shanks. The handle, which is entirely independent of the waffle-pan, is attached thereto by opening it and inserting its flattened end in the slot P of either section in such manner that the opposite ends of the T-arm will be received in the semicircular grooves O, formed, as described, on each side of the vertical slots P. When, now, the pan is closed, the similar slot and semicircular grooves formed in the shank L of the other section will operate to lock the handle in position, in which, however, it has pivotal movement of sufficient freedom to turn, so that by raising the handle a quarter-turn is imparted to the pan, and by depressing it the handle serves to impart the complete half-revolution to the pan, whereby the pan-sections are reversed. This operation of turning the pan by means of the handle in the manner set forth is due to the fact that the handle has a pivotal connection with the hinged journal at one side of its axis, said pivotal connection being made so that the handle may be oscillated in a direction in line with the rotary movement of the pan, but is prevented from moving at right angles to such line; and hence, by imparting downward pressure on the handle in an outward direction from the hinge, the upper section of the pan will be raised and the waffle-iron opened.

Having fully described my invention, what I claim as new, and desire to secure by Letters Patent, is—

1. In a waffle-iron, a combined hinge and journal cast integral with the pan-sections, substantially as set forth.

2. In a waffle-iron, the combination, with a hinge connecting the pan-sections, of a handle adapted to be pivotally connected with said hinge, substantially as set forth.

3. In a waffle-iron, the combination, with the combined hinge and journal, cast integral with the pan-sections, of a handle adapted to be pivotally attached to said hinge, and adapted to rotate and open the pan-sections, substantially as set forth.

4. In a waffle-iron, the waffle-pans constructed with a hinge, and semicircular flanges formed integral with the hinge, in combination with a supporting-frame constructed with a semicircular groove adapted to receive said semicircular flanges, substantially as set forth.

5. A waffle-pan the two sections of which are each provided with a shank and a flange, the latter being adapted to form, when the sections are united, both a journal and hinge for the pan, the said shanks being vertically slotted and grooved to receive in pivotal adjustment the T-shaped end of the pan-handle, substantially as set forth.

ALEXANDER G. PATTON.

In presence of—
  JOHN G. DUN, Jr.,
  GEO. S. PETERS.